United States Patent
Clark et al.

(10) Patent No.: US 11,098,608 B2
(45) Date of Patent: Aug. 24, 2021

(54) CMC BOAS WITH INTERNAL SUPPORT STRUCTURE

(71) Applicant: United Technologies Corporation, Farmington, CT (US)

(72) Inventors: Thomas E. Clark, Sanford, ME (US); Daniel J. Whitney, Topsham, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 52 days.

(21) Appl. No.: 16/352,432

(22) Filed: Mar. 13, 2019

(65) Prior Publication Data

US 2020/0291805 A1 Sep. 17, 2020

(51) Int. Cl.
*F01D 11/08* (2006.01)
*B29C 70/30* (2006.01)
*F01D 25/24* (2006.01)

(52) U.S. Cl.
CPC .............. *F01D 11/08* (2013.01); *B29C 70/30* (2013.01); *F01D 25/246* (2013.01); *F05D 2240/11* (2013.01); *F05D 2240/55* (2013.01); *F05D 2260/30* (2013.01); *F05D 2300/6033* (2013.01)

(58) Field of Classification Search
CPC .... F01D 11/08; F01D 25/246; F05D 2240/11; F05D 2240/55; F05D 2260/30; F05D 2300/6033
See application file for complete search history.

(56) References Cited

U.S. PATENT DOCUMENTS

| | | | |
|---|---|---|---|
| 9,932,901 B2* | 4/2018 | Sener | F02C 7/20 |
| 10,385,718 B2* | 8/2019 | O'Leary | F01D 11/24 |
| 10,641,120 B2* | 5/2020 | Thomas | F02C 7/12 |
| 2005/0271505 A1 | 12/2005 | Alford | |
| 2016/0258311 A1 | 9/2016 | Varney et al. | |
| 2017/0268362 A1 | 9/2017 | McCaffrey et al. | |
| 2018/0106160 A1 | 4/2018 | Thomas et al. | |
| 2019/0284958 A1* | 9/2019 | Schilling | F01D 25/246 |
| 2020/0055789 A1* | 2/2020 | Smyth | C04B 41/5059 |

(Continued)

FOREIGN PATENT DOCUMENTS

| | | |
|---|---|---|
| EP | 2540994 | 1/2013 |
| EP | 3093449 | 11/2016 |

(Continued)

OTHER PUBLICATIONS

Partial EP Search Report for EP Application No. 201596434 dated May 20, 2020.

(Continued)

*Primary Examiner* — Brian P Wolcott
(74) *Attorney, Agent, or Firm* — Carlson, Gaskey & Olds, P.C.

(57) ABSTRACT

A blade outer air seal includes a base portion that extends between a first circumferential side and a second circumferential side and from a first axial side to a second axial side. A first wall is axially spaced from a second wall. The first and second walls extend from the base portion to an outer wall. A rib extends from the base portion to the outer wall and spaced axially between the first and second walls.

17 Claims, 4 Drawing Sheets

(56) References Cited

U.S. PATENT DOCUMENTS

| | | | |
|---|---|---|---|
| 2020/0080437 A1* | 3/2020 | Clark | F01D 25/246 |
| 2020/0095880 A1* | 3/2020 | Clark | F01D 11/005 |
| 2020/0095893 A1* | 3/2020 | Blaney | F01D 11/08 |
| 2020/0182077 A1* | 6/2020 | Johnson | F01D 25/246 |
| 2020/0318491 A1* | 10/2020 | Barker | F01D 11/005 |

FOREIGN PATENT DOCUMENTS

| | | |
|---|---|---|
| EP | 3115561 | 1/2017 |
| EP | 3115565 | 1/2017 |
| EP | 3121387 | 1/2017 |
| WO | 2005008033 | 4/2006 |
| WO | 2015191186 | 12/2015 |

OTHER PUBLICATIONS

Extended EPSearch Report for EP Application No. 201596434 dated Aug. 9, 2020.

* cited by examiner

CMC BOAS WITH INTERNAL SUPPORT STRUCTURE

BACKGROUND

This application relates to a ceramic matrix composite blade outer air seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal includes a base portion that extends between a first circumferential side and a second circumferential side and from a first axial side to a second axial side. A first wall is axially spaced from a second wall. The first and second walls extend from the base portion to an outer wall. A rib extends from the base portion to the outer wall and spaced axially between the first and second walls.

In a further embodiment of the above, the rib extends from the first circumferential side to the second circumferential side.

In a further embodiment of any of the above, the first and second walls extend from the first circumferential side to the second circumferential side.

In a further embodiment of any of the above, the rib is arranged at an angle relative to the first wall.

In a further embodiment of any of the above, the angle is less than about 45°.

In a further embodiment of any of the above, the angle is less than about 30°.

In a further embodiment of any of the above, a first passage is defined between the rib and the first wall. A second passage is defined between the rib and the second wall.

In a further embodiment of any of the above, the first passage is configured to have a first pressure. The second passage is configured to have a second pressure that is lower than the first pressure.

In a further embodiment of any of the above, first and second cutouts are formed in the first wall and the outer wall. The first cutout is arranged near the first circumferential side. The second cutout is arranged near the second circumferential side.

In a further embodiment of any of the above, the first and second cutouts form mating surfaces configured to engage a support structure.

In a further embodiment of any of the above, a slot is formed in the second wall.

In a further embodiment of any of the above, at least one metering hole extends through the rib.

In a further embodiment of any of the above, the base portion, the first and second walls, and the outer wall have the same thickness.

In a further embodiment of any of the above, the blade outer air seal is a ceramic matrix composite material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure and arranged circumferentially about the axis of rotation and radially outward of the outer tip. Each segment has a first wall axially spaced from a second wall. The first and second walls are joined to a base portion and an outer wall. A rib extends from the base portion to the outer wall and is spaced axially between the first and second walls.

In a further embodiment of any of the above, each segment has first and second cutouts in the first wall and the outer wall. The first and second cutouts are engaged with the support structure.

In a further embodiment of any of the above, each segment has first and second slots in the second wall. The first and second slots are engaged with the support structure.

In another exemplary embodiment, a method of forming a component includes wrapping a matrix composite laminate about a first mandrel to form a first portion that has a first passage. A matrix composite laminate is wrapped about a second mandrel to from a second portion that has a second passage. A matrix composite is wrapped about the first and second portions to form a component such that a rib is formed between the first and second passages.

In a further embodiment of any of the above, the component is a blade outer air seal.

In a further embodiment of any of the above, the method includes machining a cutout in the component.

These and other features may be best understood from the following drawings and specification.

DETAILED DESCRIPTION

Figure 1:
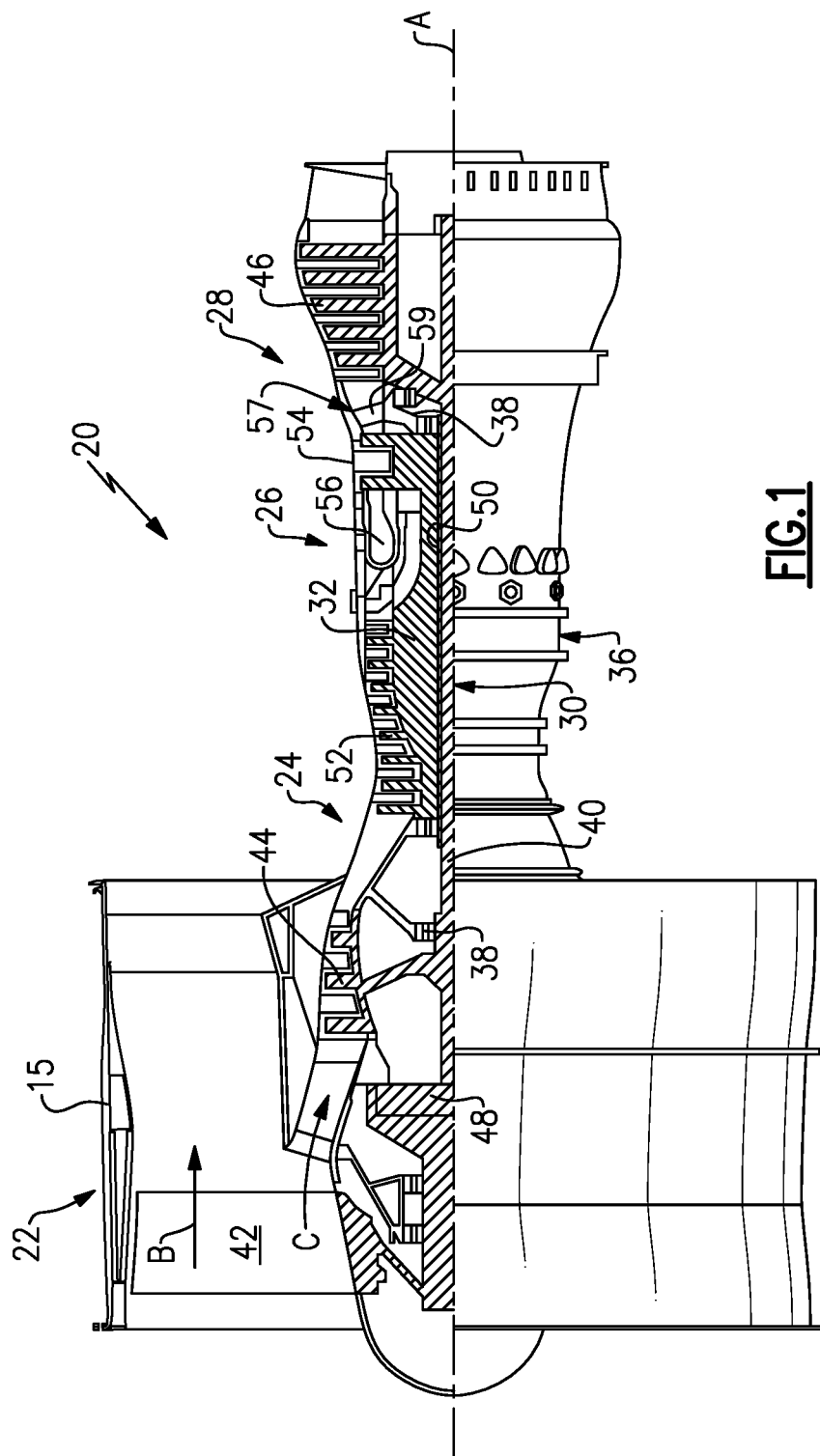
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
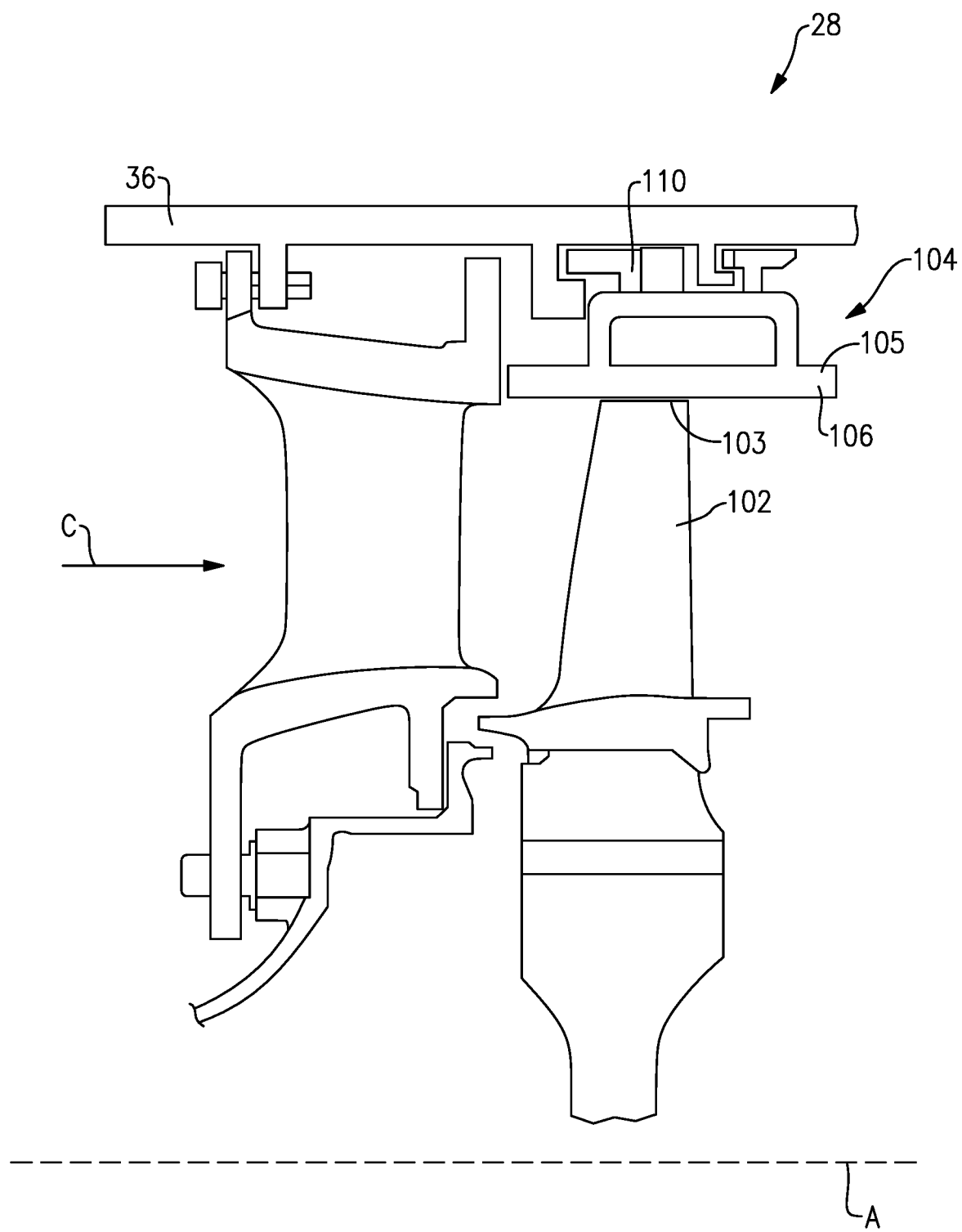
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
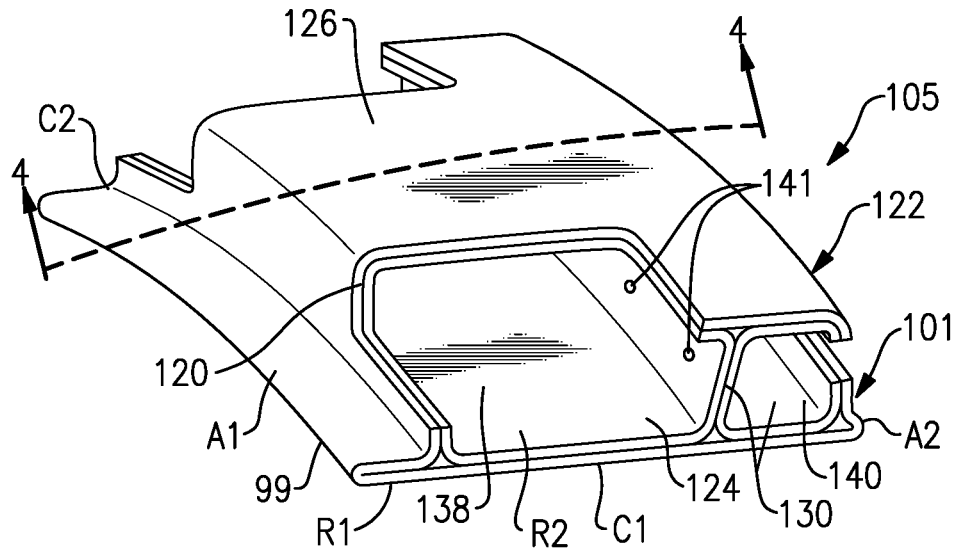
FIG. 3 shows an exemplary blade outer air seal segment.

FIG. 3 illustrates an exemplary BOAS segment 105. The seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). That is, the first axial side A1 corresponds to a leading edge 99, and the second axial side A2 corresponds to a trailing edge 101.

In the illustrated example, the BOAS segment 105 includes a first axial wall 120 and a second axial wall 122 that extend radially outward from a base portion 124. The first and second axial walls 120, 122 are axially spaced from one another. Each of the first and second axial walls 120, 122 extends along the base portion 124 in a generally circumferential direction along at least a portion of the seal segment 105. The base portion 124 extends between the leading edge 99 and the trailing edge 101 and defines a gas path on a radially inner side and a non-gas path on a radially outer side. An outer wall 126 extends between the first and second axial walls 120, 122. The outer wall 126 includes a generally constant thickness and constant position in the radial direction. In this disclosure, forward, aft, upstream, downstream, axial, radial, or circumferential is in relation to the engine axis A unless stated otherwise. The base portion 124 may extend axially forward and aft of the first and second walls 120, 122, and provides a flat surface for sealing of the BOAS leading and trailing edges 99, 101. For example, the base portion 124 includes a portion axially forward of the first axial wall 120 for engagement with at least one seal, such as a brush seal.

A rib 130 extends between the base portion 124 and the outer wall 126 between the first and second axial walls 120, 122. The rib 130 extends in a circumferential direction along at least a portion of the BOAS seal segment 105. In one example, the rib 130 extends the entire circumferential length of the base portion 124.

The first axial wall 120, the rib 130, the outer wall 126, and the base portion 124 of the BOAS seal segment 105 define a first passage 138. The second axial wall 122, the rib 130, the outer wall 126, and the base portion 124 of the BOAS seal segment 105 define a second passage 140. The first and second passages 138, 140 extend along the seal segment 105 in a circumferential direction. The first and second passages 138, 140 are generally parallel to one another. These two discrete, circumferentially running passages 138, 140 may improve BOAS strength.

In one example embodiment, metering holes 141 extend through the rib 130 between the first and second passages 138, 140. The first and second passages 138, 140 are pressurized. In one example, the first passage 138 has a higher pressure than the second passage 140. The pressure in the first passage 138 and the pressure in the gaspath define a first pressure ratio. The pressure in the second passage 140 and the pressure in the gaspath define a second pressure ratio. The lower pressure in the second passage 140, and thus the lower second pressure ratio, may improve loads on the seal segment 105 and improve leakage of cooling air.

Figure 4:
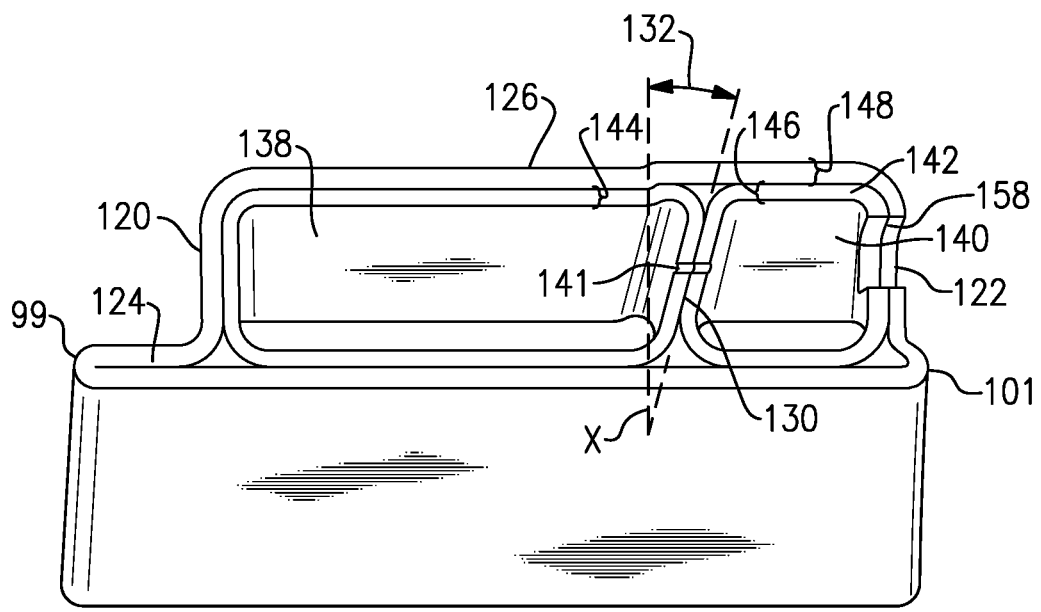
FIG. 4 shows a cross section of the blade outer air seal segment of FIG. 3.

As shown in FIG. 4, the axial rib 130 is arranged at an angle 132 relative to a radial direction X. The radial direction X is generally parallel to the first and second axial walls 120, 122. The angle 132 may be between about 0° and about 45°. In another example, the angle 132 may be between about 0° and about 30°. In one example, the angle 132 is about 5°. The angle 132 may help reduce thermal and mechanical stress on the BOAS seal segment 105, and reduce pressure in the cooling edge.

The BOAS 106 may be formed of a ceramic matrix composite ("CMC") material. Each seal segment 105 is formed of a plurality of CMC laminates 142. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets, in tooling, injecting a liquid resin into the tooling, and curing to form a solid composite component. The component may be densified by adding additional material to further stiffen the laminates.

In an embodiment, the BOAS segment 105 is formed from three loops of CMC laminated plies. A first loop 144 defines the first passage 138, and the second loop 146 defines the second passage 140. The first and second loops 144, 146 form the rib 130. The first and second loops 144, 146 comprise the inner-most layers relative to the respective first and second passages 138, 140. In one example embodiment, the first and second loops 144, 146 are each formed from four laminated plies 142. A third loop 148 is formed about the first and second loops 144, 146 to form the outermost layers relative to the first and second passages 138, 140. In one example embodiment, the third loop 148 is formed from four laminated plies 142.

In an example embodiment, the BOAS segment 105 has a constant wall thickness of about 8-9 laminated plies, with each ply having a thickness of between about 0.005 and 0.020 inches (0.127-0.508 mm). In a further embodiment, each ply has a thickness of about 0.011 inches (0.279 mm). This structure may reduce thermal gradient stress. Although 8 or 9 laminated plies are described, BOAS constructed of more or fewer plies may fall within the scope of this disclosure.

In one example, the first and second loops 144, 146 are formed from laminates wrapped around core mandrels. The first and second loops 144, 146 are formed by utilizing two different circumferentially running mandrels. The use of two mandrels also forms the rib 130 between the first and second loops 144, 146. The two mandrels may be generally trapezoidal in shape, such that the rib 130 formed by the first and second loops 144, 146 is at an angle relative to first and second walls 120, 122. The third loop 148 is then formed about the first and second loops 144, 146. The third loop 148 forms the outermost layers relative to the first and second passages 138, 140. In some embodiments, after the laminate plies 142 are formed into a seal segment 105, additional features are machined in to form mating surfaces and/or cooling holes. The seal segment 105 may be ultrasonically machined, for example.

Figure 5:
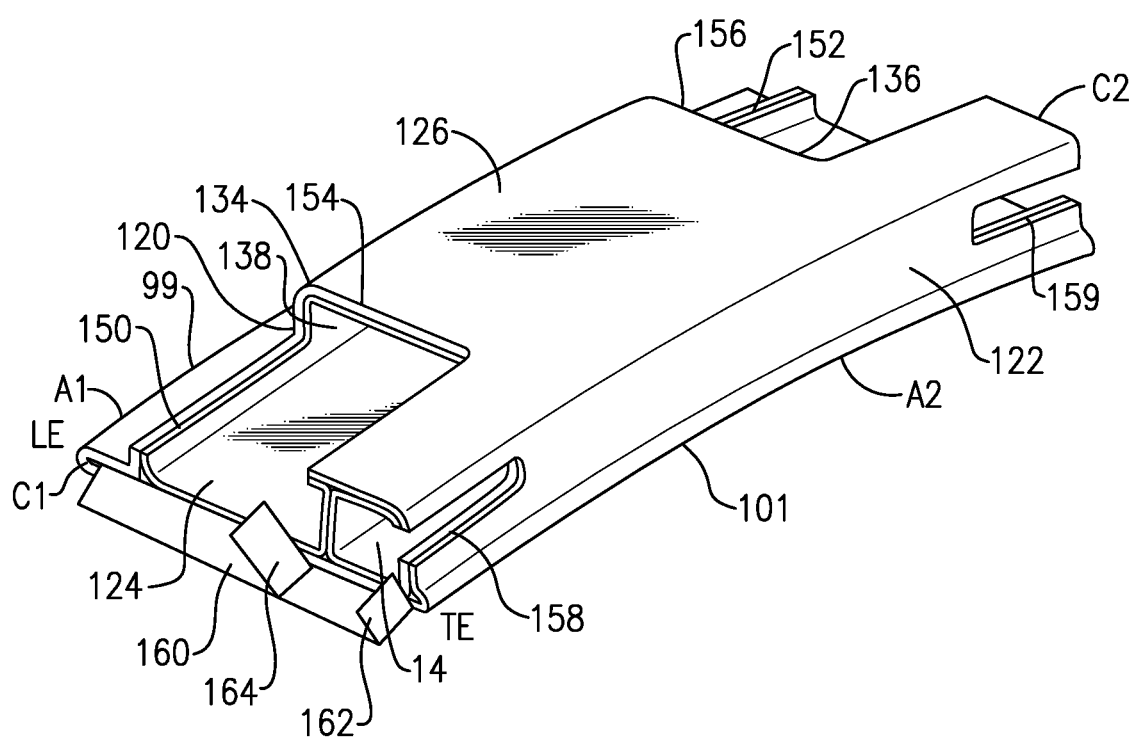
FIG. 5 shows another view of the blade outer air seal segment of FIG. 3.

As is shown in FIG. 5, first and second cutouts 134, 136 are machined into the first wall 120 and outer wall 126. The cutouts 134, 136 facilitate mating to the turbine section support structure. First and second cutouts 134, 136 form mating surfaces 150, 152 in the first wall 120 and mating surfaces 154, 156 in the outer wall 126. These mating surfaces 150, 152, 154, 156 provide anti-rotation faces that engage with the support structure 110. These cutouts 134, 136 enable large hook contact surfaces to improve circumferential tipping stability.

First and second slots 158, 159 may be machined into the second wall 122. In one embodiment, the cutouts 134, 136 and slots 158, 159 are ultrasonically machined into the BOAS segment 105. The cutouts 134, 136 and slots 158, 159 allow interfaces to the turbine support structure. Portions of the outer wall 126 near the first and second cutouts 134, 136 and the first and second slots 158, 159 provide radial reaction surfaces. These portions of the outer wall 126 prevent radial wobble in the BOAS segment 105.

A feather seal 160 may be used for sealing between circumferential ends C1, C2 of adjacent seal segments 105. The feather seal 160 extends along the axial length of the BOAS segment 105. The feather seal 160 may have radially extending portions 162, 164 for engagement with the second wall 122 and the rib 130, respectively. This arrangement permits the center rib 130 to act as an additional sealing surface to improve BOAS sealing.

Known CMC BOAS require a large contact area with supports while also having few radial features to minimize thermal gradients. Known CMC BOAS may also require support designs that are complicated to manufacture. The disclosed hollow BOAS structure with a rib allows a larger contact area, permitting lower deflection and reduced stresses. The two passages 138, 140 may improve mateface leakage, by lowering the pressure ratio across the BOAS hot-wall to the gaspath. The disclosed configuration may also reduce the thermal gradient stresses throughout the BOAS 106. This is particularly beneficial for ceramic BOAS because ceramic materials are not as ductile as metallic materials. The ability to use ceramic BOAS promotes a more stable assembly. The disclosed CMC BOAS has simple features that are easily manufactured using CMC laminates.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
a base portion extending between a first circumferential side and a second circumferential side and from a first axial side to a second axial side;
a first wall axially spaced from a second wall, the first and second walls extending from the base portion to an outer wall, wherein first and second cutouts are each formed in the first wall and the outer wall, the first cutout arranged near the first circumferential side, and the second cutout arranged near the second circumferential side; and
a rib extending from the base portion to the outer wall spaced axially between the first and second walls, wherein a slot is formed in the second wall between the base portion and the outer wall.

2. The blade outer air seal of claim 1, wherein the rib extends from the first circumferential side to the second circumferential side.

3. The blade outer air seal of claim 1, wherein the first and second walls extend from the first circumferential side to the second circumferential side.

4. The blade outer air seal of claim 1, wherein the rib is arranged at an angle relative to the first wall.

5. The blade outer air seal of claim 4, wherein the angle is less than 45°.

6. The blade outer air seal of claim 5, wherein the angle is less than 30°.

7. The blade outer air seal of claim 1, wherein a first passage is defined between the rib and the first wall and a second passage is defined between the rib and the second wall.

8. The blade outer air seal of claim 7, wherein the first passage is configured to have a first pressure and the second passage is configured to have a second pressure that is lower than the first pressure.

9. The blade outer air seal of claim 7, wherein the first passage has a trapezoidal shape.

10. The blade outer air seal of claim 1, wherein the first and second cutouts form mating surfaces configured to engage a support structure.

11. The blade outer air seal of claim 1, wherein at least one metering hole extends through the rib.

12. The blade outer air seal of claim 1, wherein the base portion, the first and second walls, and the outer wall have the same thickness.

13. The blade outer air seal of claim 1, wherein the blade outer air seal is a ceramic matrix composite material.

14. A turbine section for a gas turbine engine, comprising:
a turbine blade extending radially outwardly to a radially outer tip and for rotation about an axis of rotation;
a blade outer air seal having a plurality of segments mounted in a support structure and arranged circumferentially about the axis of rotation and radially outward of the outer tip; and
wherein each segment has a first wall axially spaced from a second wall, the first and second walls joined to a base portion and an outer wall, and a rib extending from the base portion to the outer wall spaced axially between the first and second walls, and wherein each segment has first and second cutouts in the first wall and the outer wall, the first and second cutouts engaged with the support structure, wherein a slot is formed in the second wall between the base portion and the outer wall.

15. The turbine section of claim 14, wherein each segment has a second slot in the second wall, the slot and the second slot engaged with the support structure.

16. The turbine section of claim 14, wherein a first passage is defined between the rib and the first wall and a second passage is defined between the rib and the second wall, and the first passage has a trapezoidal shape.

17. The turbine section of claim 14, wherein a feather seal is arranged along a circumferential side of each segment, the feather seal extending along an axial length of each segment, the feather seal having a radially extending portion that engages the rib.

* * * * *